(12) United States Patent
Enning et al.

(10) Patent No.: US 11,471,014 B2
(45) Date of Patent: Oct. 18, 2022

(54) SUCTION CLEANING ATTACHMENT (71) Applicant: Mr. Wash Autoservice AG, Essen (DE)

(72) Inventors: Richard Enning, Muelheim (DE); Cornelis van de Pol, Hagen (DE)

(73) Assignee: Mr. Wash Autoservice AG, Essen (DE)

( * ) Notice: Subject to any disclaimer, the term of this patent is extended or adjusted under 35 U.S.C. 154(b) by 169 days.

(21) Appl. No.: 16/765,194

(22) PCT Filed: Dec. 19, 2019

(86) PCT No.: PCT/EP2019/086278
§ 371 (c)(1),
(2) Date: May 19, 2020

(87) PCT Pub. No.: WO2020/182332
PCT Pub. Date: Sep. 17, 2020

(65) Prior Publication Data
US 2021/0212532 A1 Jul. 15, 2021

(30) Foreign Application Priority Data
Mar. 13, 2019 (DE) ...................... 10 2019 001 722.6

(51) Int. Cl.
*A47L 9/02* (2006.01)
*A47L 5/38* (2006.01)
(Continued)

(52) U.S. Cl.
CPC .................. *A47L 9/02* (2013.01); *A47L 5/38* (2013.01); *A47L 9/242* (2013.01); *B60S 3/008* (2013.01)

(58) Field of Classification Search
CPC ... A47L 9/02; A47L 9/24; A47L 9/242; A47L 9/244; A47L 9/248; A47L 9/06;
(Continued)

(56) References Cited

U.S. PATENT DOCUMENTS 5,836,620 A * 11/1998 Wang ...................... A47L 9/244
285/7
5,950,276 A * 9/1999 Everts ....................... A47L 9/02
15/405

(Continued)

FOREIGN PATENT DOCUMENTS

DE 102004025390 A1 12/2005
KR 900004590 Y1 * 5/1990

OTHER PUBLICATIONS

KR 900004590Y1 Translation; Suction Cleaners, Chong, Kwang-Young; May 25, 1990, p. 1-4 (Year: 1990).*

(Continued)

*Primary Examiner* — Orlando E Aviles
*Assistant Examiner* — Sidney D Hohl
(74) *Attorney, Agent, or Firm* — Jason H. Vick; Sheridan Ross, PC (57) ABSTRACT

The invention relates to a suction cleaning attachment (1) of a cleaning device (2) for use for the interior cleaning of motor vehicles by means of a suction air flow and provided for insertion and for holding in a quiver (3) when not in use, with a housing (5) having an internal suction channel (4) for guiding the suction air flow and a grip region (6) provided on the outside of the housing (5), wherein the suction channel (4) leads into a suction opening (8) at its outer end (7). According to the invention it is proposed that on the outside of the housing (5) between the suction opening (8) and the grip region (6), a stop (9) constructed as a step or a stop (9) projecting beyond the grip region (6) is provided for interaction with the outer edge (10) of the quiver (3).

16 Claims, 9 Drawing Sheets

(51) Int. Cl.
*A47L 9/24* (2006.01)
*B60S 3/00* (2006.01)

(58) Field of Classification Search
CPC ...... A47L 9/327; A47L 9/0036; A47L 7/0076; A47L 7/008; A47L 7/009; A47L 5/38; A47L 9/2821; A47L 9/2842; A47L 9/0009; A47L 9/0018; A47L 9/0027; A47L 9/0045; B60S 3/008
USPC .......... 15/24, 28, 314, 321, 322, 323, 415.1, 15/416–422.1
See application file for complete search history.

(56) References Cited

U.S. PATENT DOCUMENTS

| | | | | |
|---|---|---|---|---|
| 6,108,861 | A * | 8/2000 | Vystrcil | A47L 5/32 15/315 |
| 2003/0196292 | A1 | 10/2003 | Sams et al. | |
| 2004/0255425 | A1 * | 12/2004 | Arai | A47L 9/2857 15/300.1 |
| 2007/0040376 | A1 * | 2/2007 | Choi | A47L 9/242 285/275 |
| 2008/0115311 | A1 * | 5/2008 | Sheddy | A47L 9/0027 15/323 |
| 2010/0018001 | A1 * | 1/2010 | Buller | A47L 9/244 138/129 |
| 2011/0173771 | A1 * | 7/2011 | Park | A47L 9/009 15/328 |

OTHER PUBLICATIONS

KR 900004590Y1, Suction Cleaners, Chong, Kwang-Young; May 25, 1990, p. 1-3 (Year: 1990).*
International Search Report for International Application No. PCT/EP2019/086278, dated Mar. 27, 2020.
Written Opinion for International Application No. PCT/EP2019/086278, dated Mar. 27, 2020.
International Preliminary Report on Patentability for International Application No. PCT/EP2019/086278, dated Sep. 23, 2021.

* cited by examiner

SUCTION CLEANING ATTACHMENT

CROSS REFERENCE TO RELATED APPLICATIONS

This application is a national stage application under 35 U.S.C. 371 of PCT Application No. PCT/EP2019/086278 having an international filing date of 19 Dec. 2019, which designated the United States, which PCT application claimed the benefit of German Application No. 10 2019 001 722.6, filed 13 Mar. 2019, each of which are incorporated herein by reference in their entirety.

The present invention relates to a suction cleaning attachment of a cleaning device for use in the interior cleaning of motor vehicles by means of a suction air flow. The suction cleaning attachment is intended to be inserted and held in a quiver when not in use. Finally, the suction cleaning attachment can be removed from the quiver for the interior cleaning of motor vehicles.

Accordingly, the non-use state is intended before and after the interior cleaning of the motor vehicles. The suction cleaning attachment is used to extract dirt particles from the interior of motor vehicles by means of a suction air flow.

The suction cleaning attachment has an internal suction channel for guiding the suction air flow. It also has a housing and a handle area provided on the outside of the housing. The suction channel opens into a suction opening at its outer end.

The grip region is the section of the suction cleaning attachment that protrudes over the outer edge of the quiver when the suction cleaning attachment is inserted into the quiver. The user grips and/or grasps this grip region in order to remove the suction cleaning attachment from the quiver and then use the suction cleaning attachment for internal cleaning.

The state of the art in cleaning devices, which are usually assigned a plurality of suction cleaning attachments, in fact provides for continuous operation or continuous provision of the suction air flow for all assigned suction cleaning attachments, so that the negative pressure of the suction air flow is maintained both when in use and when not in use.

The disadvantage of the system known up to now is, however, that the suction cleaning attachment is comparatively difficult to remove from the quiver and can only be removed with great effort. This can lead to damage if the user pulls the suction cleaning attachment or the associated suction hose with force.

Furthermore, the state of the art basically requires a high amount of energy to provide the continuous flow of suction air. The electrical energy is required to maintain the required negative pressure of the suction air flow for the entire system.

The object of the present invention is now to avoid or at least substantially reduce the aforementioned disadvantages of the state of the art.

According to the invention, a suction cleaning attachment of the above-mentioned design is provided with a stop formed as a step or a stop protruding over the grip region on the outside of the housing between the suction opening and the grip region to interact with the outer edge or the edge of the quiver in order to solve the above-mentioned problem.

Preferably, the stop, especially the circumferential stop, closes at least substantially flush with the outer edge of the quiver. It is preferred that the stop protrudes over the outer edge of the quiver when the suction cleaning attachment is inserted in the quiver.

According to the invention, the outer edge of the quiver is also understood in the following as the outer edge region of the quiver—both inside and outside—or the outer border edge. In particular, the stop of the suction cleaning attachment can be located at least in some areas within the outer edge area of the quiver in the non-use state.

For example, the quiver may have an inner stop located in the outer edge area to close, preferably flush, with the stop of the suction cleaning attachment. As a result, the stop of the suction cleaning attachment can be surrounded at least in part by the outer edge of the quiver in the non-use state. In the following, the aforementioned arrangement of the stop of the suction cleaning attachment in the outer edge area is also understood as a "flush closure" between the quiver and the stop of the suction cleaning attachment.

The quiver forms a receptacle for the suction cleaning attachment, wherein it has an outer surface and an end- and/or frontally closed underside. The quiver opening, into which the suction cleaning attachment can be inserted, is ultimately open or exposed and easily accessible to the user. In particular, the quiver can have a hollow cylindrical shape.

Furthermore, the casing is at least essentially tight on its outer surface and on its closed underside, in particular wherein the quiver has no further openings apart from the quiver opening.

According to the invention, the stop enables an at least substantially pressure-tight seal between the quiver and the suction cleaning attachment to be ensured in the state of non-use. This results in a large number of advantages according to the invention.

The stop also provides a limitation of the insertion movement of the suction cleaning attachment into the quiver. In particular, insertion into the quiver beyond the stop is not intended or not even possible.

In addition, the handling of the suction cleaning attachment is made easier, wherein the suction cleaning attachment can be grasped by one hand of a user in the grip region, thus ensuring easier operation. In any case, a predetermined, preferably clearly identifiable, grip region is provided, which, in the state of non-use and in the inserted state in the quiver, is arranged outside the quiver. In particular, the grip region is not limited on the outside, so that the user of the suction cleaning attachment can easily grasp the grip region from different positions. In addition, the grip region can be freely accessible from all sides. The grip region is not limited by a bracket or the like and is therefore freely accessible so that the suction cleaning attachment can be used or the grip region can be grasped from any user situation.

The stop and the resulting defined grip region also ensure that the suction cleaning attachment can be easily removed from the quiver. Since the suction cleaning attachment cannot be pulled into the quiver due to the stop, the user can easily grasp the defined grip region and easily "pull" the suction cleaning attachment out of the quiver. After disconnecting the pressure-tight seal, the suction cleaning attachment can be removed from the quiver easily and without great effort.

Furthermore, it was recognized during the development of the invention that the energy required for the blower device can be significantly reduced, preferably by up to 20%, due to the at least essentially pressure-tight seal between the quiver and the suction cleaning attachment. It has been recognized in the invention that the at least substantially pressure-tight seal between the outer edge of the quiver and the stop makes it possible to maintain a negative pressure in the state of non-use relatively easily—i.e. with a low energy input. An at least essentially self-contained system with the negative pressure of the suction air flow is thus made possible in the non-used state according to the invention.

In order to interact with the outer edge of the quiver, it is in particular necessary for the stop to be positioned at the outer edge of the quiver so that an at least substantially pressure-tight seal is created between the quiver and the suction cleaning attachment. In this context, there would basically be two imaginable designs. Firstly, the stop can be designed as a step, wherein the step is arranged between the grip region, which is arranged outside the quiver in the non-used state (i.e. state of the suction cleaning attachment inserted into the quiver), and the front section of the suction cleaning attachment inserted into the quiver. Alternatively or additionally, it is secondly provided according to the invention that the stop protrudes over the grip region and can thus actually be designed as a projection.

In the case of a particularly preferred embodiment, it is provided that the stop is designed as a circumferential, in particular annular, projection. The stop directly adjoins the housing and/or forms part of the housing. Preferably, the stop is designed to correspond to the shape of the outer edge of the casing, so that a flush fit is achieved.

Preferably, the suction cleaning attachment has a grip section with two outer connection ends and a grip section region provided between the connection ends. The grip section region can, in particular, form the aforementioned grip region.

The outside diameter of at least one connection end can also be larger than the outside diameter of the grip section region. This ensures that the user's hand can only slip within the grip section region. Furthermore, the user can clearly see which part of the suction cleaning attachment forms the grip region and/or the grip section region that is intended for the user to grip the suction cleaning attachment.

The grip section region serves to make the suction cleaning attachment easy to handle. There is no recessed contact surface for the user's hands in vacuum nozzles known in practice. The central grip section region on the grip section is very advantageous from an ergonomic point of view, as a predetermined area—designed to suit the ergonomics of the average user—is available as the contact surface, which is particularly important for longer periods of use. The grip section region can have a length of $(250\pm50)$ mm, wherein the outer diameter of the grip region can be $(45\pm10)$ mm.

The grip section region actually forms a defined area of the suction-cleaning attachment, which enables improved and simplified handling for the user.

In addition to the technical functionality of the grip section, the previously described shape of the grip section region results in a special aesthetic design due to the previously described shape of the grip section region, which clearly distinguishes itself from previously known suction cleaning attachments and is also appealing to the user due to its functional appearance. It is particularly preferred if the grip section region also has an indicating function, especially haptic means such as a plurality of parallel grooves. The haptic means can signal to the user that the suction cleaning attachment should be gripped in this area.

The ergonomically shaped grip section region allows fatigue-free working. This is particularly distinguished by the fact that the grip force required to hold the suction cleaning attachment can be applied for much longer than with the state-of-the-art vacuum nozzle. It is understood that the musculature in the user's hand is not overstressed and therefore an early loss of grip force can be avoided. As a result, safe handling of the inventive dust cleaning attachment can be guaranteed in sometimes narrow vehicle interiors.

Furthermore, the stop can be located at the connection end facing the suction opening. In particular, the stop protrudes externally above the surface of the connection end. The connection end can have an at least essentially hollow cylindrical shape.

According to another advantageous embodiment of the inventive idea, the grip section region has a corrugation and/or a structured surface on the outside. Such a surface of the handle section area facilitates the handling of the suction cleaning attachment and the gripping of the suction cleaning attachment in the area of the grip section region. Thus, on the one hand, an increased grip stability can be achieved and on the other hand, a visual identification of the grip area can be created. The grooves can have a distance of $5\pm2$ mm to each other.

Therefore, the haptics is also improved by the grooves and/or the structured surface and the user is also given a further signal (haptic indication) as to which area of the suction cleaning attachment forms the grip region. From a formal-aesthetic point of view, it is particularly advantageous that the grip section region can at least essentially correspond optically to the shape of the suction hose.

Furthermore, the suction cleaning attachment can be designed in at least three parts. A multi-part design of the suction cleaning attachment is advantageous from various aspects. Firstly, the individual parts can be replaced comparatively easily and inexpensively, especially when worn. In addition, the suction cleaning attachment can be modified comparatively easily so that, for example, the suction opening and/or the outer shape of the suction cleaning attachment can be individually adapted to the user and/or the respective cleaning device. In particular, the multi-part design of the suction cleaning attachment allows easy access to the suction channel and/or inside the housing, preferably during maintenance and/or repair work.

Preferably, the housing has a housing connection piece that can be detachably connected to the grip section. The housing can also include an end piece that can be detachably connected to the housing connection piece. Alternatively or additionally, the end piece may be detachably connected to the grip section. In particular, the above-mentioned components can be plugged into each other. Furthermore, it may be provided that the housing connection piece is connected to the grip section and/or the end piece is connected to the housing connection piece and/or the grip section in a form-locking, force-locking and/or friction-locking manner. A friction-locking connection, especially in the form of a plug connection, is particularly preferred. When the suction cleaning attachment is in the use state, the aforementioned parts—i.e. the grip section, the end piece and the housing connection piece—are firmly connected to each other. Even when the suction cleaning attachment is pulled out of the quiver, loosening of the grip region and/or the grip section from the housing connection piece can be avoided. However, if, for example, the grip section and the housing connection piece are twisted against each other, the connection can be released—e.g. to replace the housing connection piece.

Particularly preferred is the grip section region and/or the grip section rotationally symmetrical and/or mirror-symmetrical to a central longitudinal axis. The symmetry results in an ergonomically adapted handling of the suction cleaning attachment as well as an aesthetically appealing design of the grip section in particular. The grip section region as well as the grip section is actually a sleeve-shaped body that can be easily manufactured.

In particular, the grip section can be inserted into the housing socket with a connection region. The housing connection piece then has a receptacle corresponding to the connection region. In particular, the connection region of the grip section adjoins the inner wall of the housing connection piece. Alternatively or additionally it can be provided that the housing connection piece can be inserted into the end piece with a connection region, wherein the connection region of the end piece adjoins the inner wall of the end piece on the inside and the end piece can have a receiving area corresponding to the connection region of the housing connection piece. In addition, it is also possible for the grip section to be inserted into the housing connection piece and/or the end piece to be inserted into the housing connection piece. For this purpose, the connection regions are provided on the end piece and/or on the housing connection piece.

It is advantageous that a taper of the suction channel is provided in the housing connection piece, wherein the at least substantially hollow cylindrical shape of the grip section changes into an at least substantially slot-like shape.

In addition, the housing connection piece can have, at least in some areas, tapered transition surfaces, in particular tapered towards the suction opening. Preferably the housing connection piece and/or the end piece has two main side surfaces which, together with an upper side surface and a lower side surface, form the outer surface of the housing connection piece and/or the end piece. In this context, it may be provided that the main side surfaces have a surface area which is up to 1000%, preferably between 300% and 800%, larger than the upper and/or lower side surface in comparison with the upper side surface and/or the lower side surface. Consequently, an at least substantially elongated and/or slit-like shape of the suction opening and the suction channel can be achieved. The above shape makes it easier to handle when cleaning the interior of motor vehicles, since the housing connection piece and/or the end piece towards the suction opening have a slender shape to allow better access to narrow and poorly accessible areas in the interior of a vehicle.

In another particularly preferred embodiment of the present invention, the stop directly adjoins the housing connection piece. Preferably, the stop adjacent to the housing connection piece can protrude over the grip region, especially over the connection end. The stop can be located at the connection end and adjacent to the connection region for the housing connection piece. In particular, the thickness and/or the height of the stop can be designed to be greater than the material thickness of the housing connection piece, so that even after the housing connection piece has been arranged on the connection region of the connection end of the grip section, the stop protrudes over the housing connection piece and over the connection end. In addition, the stop can be designed so that it closes flush with the outer edge of the housing when in a non-used state.

Alternatively or additionally, a stop, preferably designed as a step, can be provided on the outside of the housing connection piece. The stop can be located on the outside of the housing connection piece and adjacent to the connection end. The step formed by the stop can be designed in such a way that the stop can limit the insertion movement of the suction cleaning attachment into the quiver.

According to the invention, operational safety can be increased by the interaction of the stop and the outer edge of the quiver, since a predetermined and defined arrangement of the suction cleaning attachment in the quiver is made possible by the stop.

It is advantageous that the end piece has a bevel at the suction end forming the suction opening. The bevel can be arranged along the at least essentially rectangular shape of the suction opening. The bevel enables an improved arrangement of the end piece with the suction opening on the surfaces to be cleaned. This facilitates the user-friendliness when used for cleaning the interior of motor vehicles.

When cleaning the interior of motor vehicles, areas of the interior that are often difficult to reach must be exposed to the suction air flow to extract dirt particles. The angled end piece at the end of the unit ensures improved contact and accessibility to areas that are difficult to reach.

In particular, the bevel at the end can run at an angle of 45°±15°, allowing areas of the interior of motor vehicles which are difficult to reach to be reached by the user without the user having to adopt a forced position.

In a further configuration of the invention, it is intended that the end piece has a marking on the outside, in particular running parallel to the bevel, as a wear indicator. The marking can either be embossed into the end piece and/or arranged on the top of the end piece by means of a coloured highlighting. The wear indicator is ultimately intended to show the user when the end piece needs to be replaced, in particular to prevent damage to the housing connection piece. In this context, it is advantageous if the mark is located behind the housing connection piece, facing the suction opening, when the end piece is connected to the housing connection piece. If the marking is exceeded, there would actually be wear on the housing connection piece, which should preferably be avoided.

In particular, the marking on the end piece inserted into the housing connection piece is arranged at a distance from the outer edge of the housing connection piece facing the suction opening.

As a result, the exchangeable end piece allows an extended period of use of the suction cleaning attachment to be achieved, in particular wherein only the end piece needs to be replaced when worn. Especially in connection with a good ecological compatibility as well as a resource-saving use of the suction cleaning attachment, such a multi-part design of the suction cleaning attachment is advantageous.

Thus, the end piece can be designed as a "wear piece", which can be easily replaced. The dimensions and design of the end piece are such that it can achieve the largest possible suction surface in the shortest possible time as well as areas of the interior of motor vehicles that are difficult to access and can at least substantially remove dirt particles.

The material provided for the housing, the end piece, the housing connection piece and/or the grip section is preferably a plastic, in particular a thermo-plastic plastic. Particularly preferred materials are polyethylene (PE), polypropylene (PP), polyvinyl chloride (PVC) and/or polystyrene (PS). The above-mentioned components of the suction cleaning attachment can consist of the above-mentioned materials in particular. The entire suction cleaning attachment is preferably made of plastic. The above-mentioned plastics are characterised in particular by high strength.

Furthermore, the cross-sectional area of the suction channel is preferably between 100 $mm^2$ and 1000 $mm^2$, preferably between 200 $mm^2$ and 800 $mm^2$, preferably between 300 $mm^2$ and 600 $mm^2$ and, in particular, at least essentially between 400 $mm^2$ and 500 $mm^2$. In particular, it is intended that the cross-sectional area of the suction channel tapers at least once, preferably at least twice, along the suction cleaning attachment in the direction of the suction air flow. In particular, a taper is provided in the area of the grip section region and/or in the area of the end piece and/or the housing connection piece. The frontal taper of the cross-sectional area of the suction channel can, in particular, achieve an increased suction power at the end suction opening.

In accordance with another advantageous design, a lighting device is provided, preferably by means of at least one, preferably two, LEDs on the end piece, the housing connection piece, the grip section region and/or the grip region, preferably on the outside, in particular facing the end piece. The lighting device can be connected to at least one cable for conducting current. The cable can preferably be arranged and/or held on the inside of the housing connection piece and/or on the inside of the end piece. Preferably, a power connection, in particular a four-pole plug, which is connected to the lighting device via the at least one cable, is arranged on the grip region. The lighting device can be mounted inside the suction air flow and/or outside the suction air flow on the housing connection piece, on the grip section and/or on the end piece. Finally, the lighting device ensures that the area to be cleaned is illuminated, especially when the light cone faces the suction opening.

To prevent contamination of the LED, to maintain the luminosity of the LED and/or to minimise the mechanical load, a protective device, in particular an LED cover, can be connected to the lighting device. The LED cover and/or the protective device can be replaced at regular intervals. The protective device can also be connected, in particular latched, to the housing connection piece, the end piece, the grip section and/or the suction channel.

In addition, a number of light sources, in particular LEDs, can also be provided inside or on the housing. If the light sources and/or the lighting device are arranged within the housing, the housing connection piece, the end piece and/or the grip section can be made transparent and/or translucent in sections.

Preferably, the lighting device can illuminate the area in the vehicle interior to be vacuumed and/or cleaned in a targeted and purpose-oriented manner. It is advantageous for the lighting device to shine over the end piece and/or the housing connection piece and is attached to the housing connection piece and/or the grip section. In particular, the lighting device can illuminate poorly illuminated areas, for example between the vehicle seats, in the vehicle interior.

A channel designed to receive the lighting device is preferably provided on the end piece and/or the housing connection piece. Preferably, the channel and/or the lighting device is integrated in the housing connection piece and/or arranged in the housing connection piece. This channel is set back relative to the suction opening. The end of the channel is thus spaced from the suction opening. This results in good illumination of the area to be cleaned, even if the end piece with the suction opening is placed on the surface to be cleaned. Good illumination of the area to be cleaned is also ensured by placing the channel back in relation to the suction opening, since the light cone and/or light beam generated by the lighting device can spread sufficiently far and radiate accordingly.

If necessary, the lighting device and/or LED lighting can be controlled via a further switch, which is preferably located in the area of the handle. The lighting device also increases the cleaning efficiency, as it makes the dirt and/or particles that can be removed by the suction cleaning attachment visible in niches, gaps and/or on the vehicle floor, for example, so that these dirt particles can be extracted in a targeted manner.

Furthermore, the present invention relates to a cleaning device for use in the interior cleaning of motor vehicles. The cleaning device has a suction cleaning attachment according to at least one of the previously described embodiments. Furthermore, the cleaning device comprises at least one quiver for holding the suction cleaning attachment in the non-used state—i.e. before and after the interior cleaning of motor vehicles. A blower device is provided for generating a negative pressure, the blower device being assigned to the suction duct via a hose (suction hose). The blower device basically provides the suction air flow required for the interior cleaning of motor vehicles, which is guided along the suction channel.

In this context, it is understood that all the above-mentioned preferred embodiment examples and the advantages according to the invention apply in the same way to the cleaning device according to the invention. In order to avoid unnecessary repetition, reference is made to the previous explanations.

In particular, the quiver can be formed as a hollow cylinder. Furthermore, the end of the quiver can be closed, wherein the stop of the suction cleaning attachment interacts with the outer edge of the quiver in such a way that an at least essentially pressure-tight seal is achieved.

The pressure-tight closure between the outer edge of the quiver and the stop of the suction cleaning attachment ensures an at least substantially enclosed, preferably pressure-tight, system between the suction cleaning attachment and the blower device, whereby the electrical energy consumption of the installation can be reduced. To the suction cleaning attachment can also be assigned at least one pressure sensor which measures the existing negative pressure and thus increases the electrical energy supplied via an energy supply device in the used state. In the non-use state, in particular the electrical energy required for the suction air flow of the suction cleaning attachment is reduced.

When the suction cleaning attachment is inserted, the stop is directly adjacent to the quiver. In particular, the stop protrudes over the outer edge of the quiver. The stop terminates the insertion movement of the suction cleaning attachment into the quiver. The stop can be designed circumferentially around the housing corresponding to the outer edge of the quiver, so that an at least essentially pressure-tight seal is made possible by avoiding frictional clamping between the suction cleaning attachment and the quiver.

Alternatively or additionally, the quiver can have an inner stop in the outer edge region for flush closure with the stop of the suction cleaning attachment, in particular wherein the stop of the suction cleaning attachment can be surrounded at least in regions by the outer edge of the quiver and/or arranged within the outer edge region of the quiver. In this connection, the outer edge of the quiver can also be understood as the outer edge of the quiver and thus also an inner stop in the outer edge region of the quiver according to the invention. The "outer edge" of the quiver does not necessarily have to be the "outermost, uppermost edge" of the quiver.

In particular, the outer edge of the quiver may have a circumferential step and/or a circumferential inner stop for flush closure with the stop of the suction cleaning attachment in the non-used state.

In particular, the hose of the blower device is connected to the connection end of the grip section facing away from the suction opening. A form-locking and/or force-locking connection is preferred.

The blower device is designed in such a way that a vacuum of between 0.3 and 0.8 bar, preferably between 0.4 and 0.6 bar, is present in the suction chamber during suction operation. The above-mentioned negative pressure ensures effective suction of the dirt particles.

Furthermore, in the case of a particularly preferred design, the blower device has a control device which reduces the electrical energy supplied to the blower device to generate the negative pressure during the state of the suction cleaning attachment inserted in the quiver.

At least one pressure sensor can be assigned to the control device, which determines the required negative pressure, which in turn can be used for regulating and/or controlling the pressure. It is understood that less electrical energy is required due to an at least essentially pressure-tight seal between the attachment and the quiver, since the pressure difference to be compensated can be significantly reduced compared to the state of use during the interior cleaning of motor vehicles.

Preferably, a blower device can be connected to a large number of suction cleaning attachments, preferably at least two. It is clear that the electrical energy supplied to the blower device can actually be reduced as soon as at least one suction cleaning attachment is arranged in a quiver. According to the invention, continuous suction operation can be provided so that a pressure-tight seal between the quiver and the stop is advantageous with regard to energy and/or operating costs.

Furthermore, it is understood that any intermediate intervals and individual values are included in the above-mentioned intervals and range limits and are to be regarded as essentially disclosed in the invention, even if these intermediate intervals and individual values are not specifically stated.

Further features, advantages and possible applications of the present invention result from the following description of examples of embodiment using the drawing and the drawing itself. All described and/or figuratively represented features, either individually or in any combination, form the subject-matter of the present invention, irrespective of their combination in the claims or their retro-relation.

It shows

Figure 1:
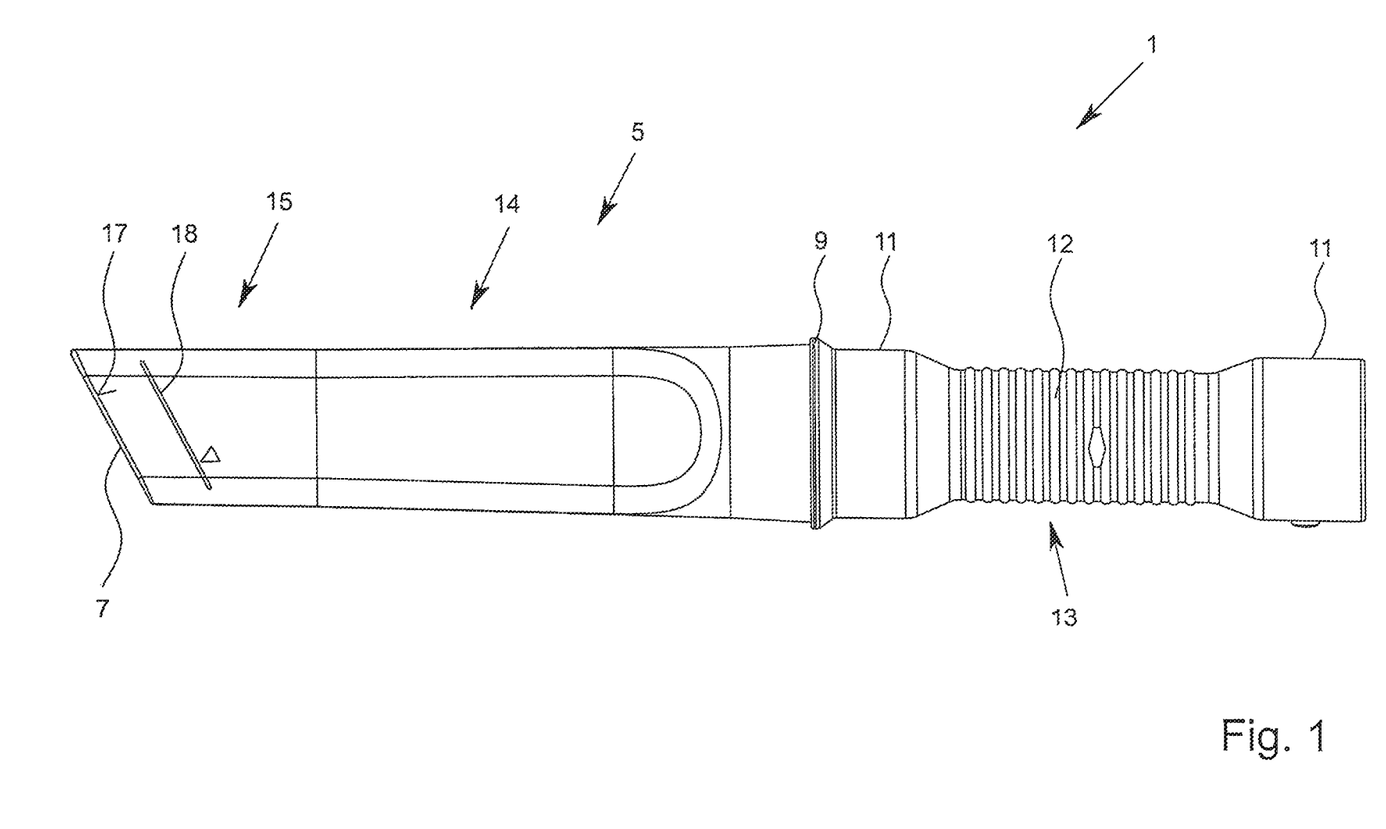
FIG. 1 a schematic side view of a suction cleaning attachment according to the invention, FIG. 2 a schematic perspective view of the inventive suction cleaning attachment shown in FIG. 1, FIG. 3 a schematic perspective explosion view of the inventive suction cleaning attachment shown in FIG. 1, FIG. 4 a schematic representation of the inventive cleaning device, FIG. 5a a schematic perspective view of the inventive quiver, FIG. 5b a schematic perspective representation of a further version of the inventive quiver, FIG. 6 a schematic side view of another version of the inventive suction cleaning attachment inserted in the quiver, FIG. 7 a schematic perspective representation of a further version of the inventive cleaning device, FIG. 8 a schematic representation of a further version of the inventive cleaning device, FIG. 9 a schematic perspective view of a section of the inventive suction cleaning attachment, FIG. 10 a schematic perspective view of a further section of the inventive suction cleaning attachment, FIG. 11 a schematic cross-sectional view of the inventive suction cleaning attachment and FIG. 12 a schematic cross-sectional representation of the inventive suction cleaning attachment inserted in a quiver.

FIG. 1 shows a suction cleaning attachment 1 of a cleaning device 2 for use in the interior cleaning of motor vehicles using a suction air flow. The suction cleaning attachment 1 is intended for insertion and mounting in a quiver 3 in the non-use state.

Figure 6:
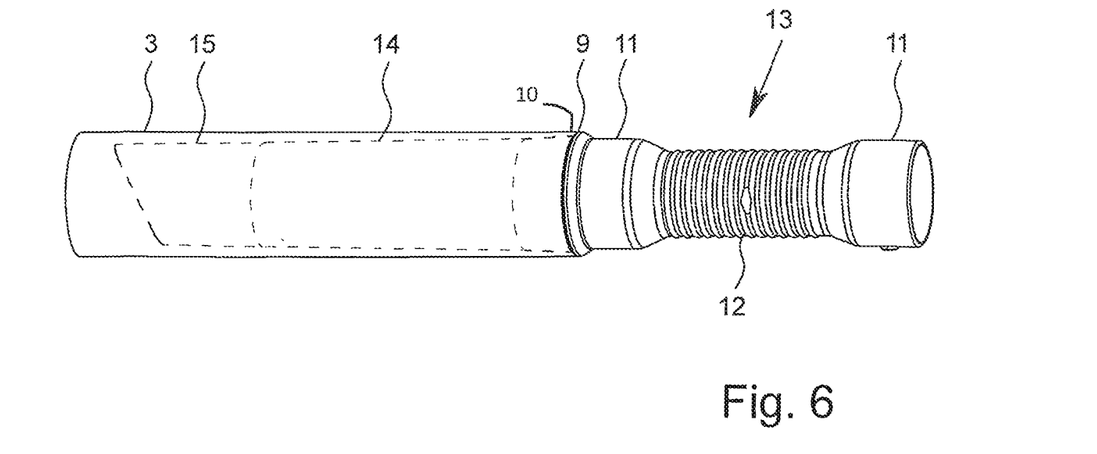
Figure 7:
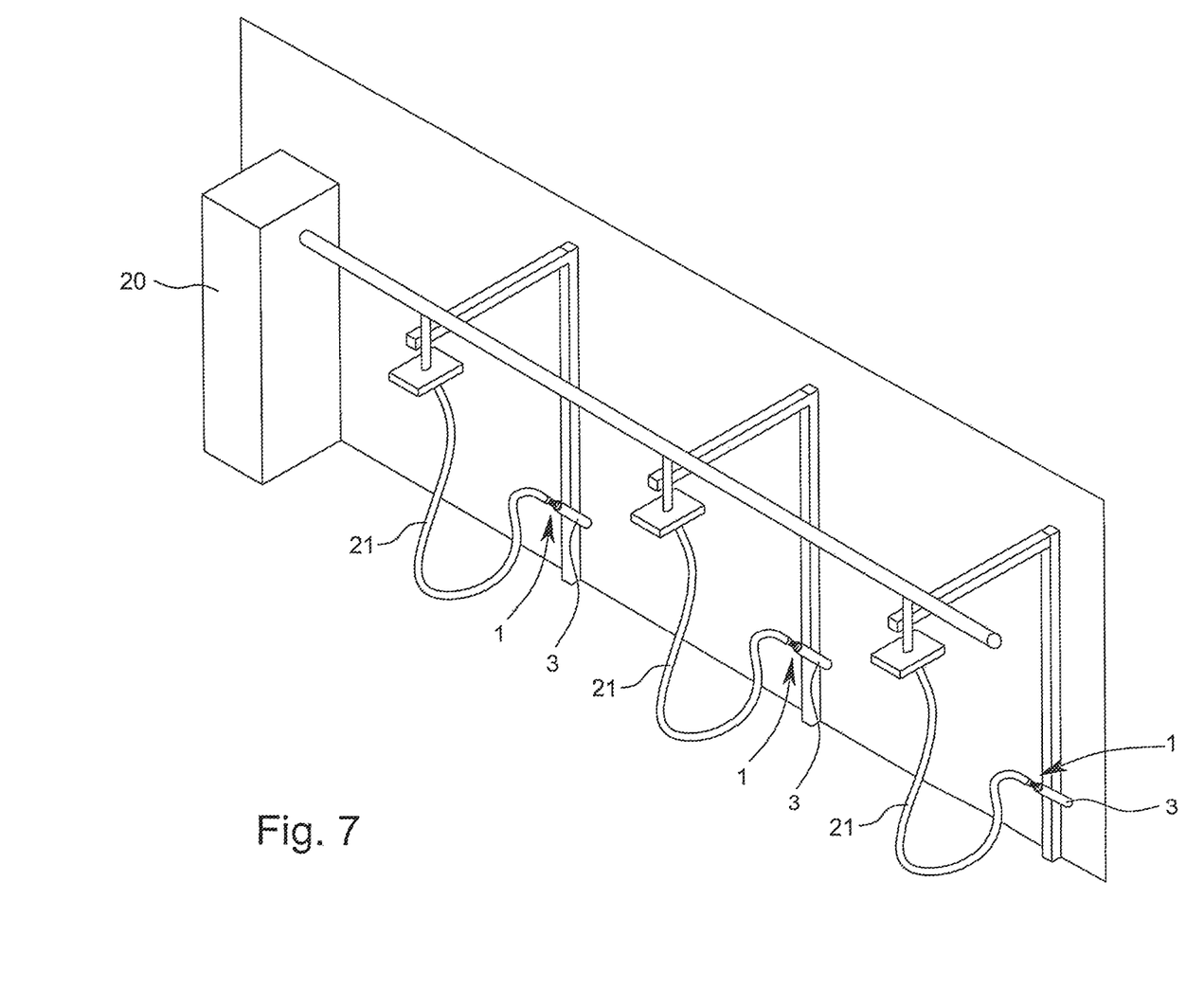
Figure 11:
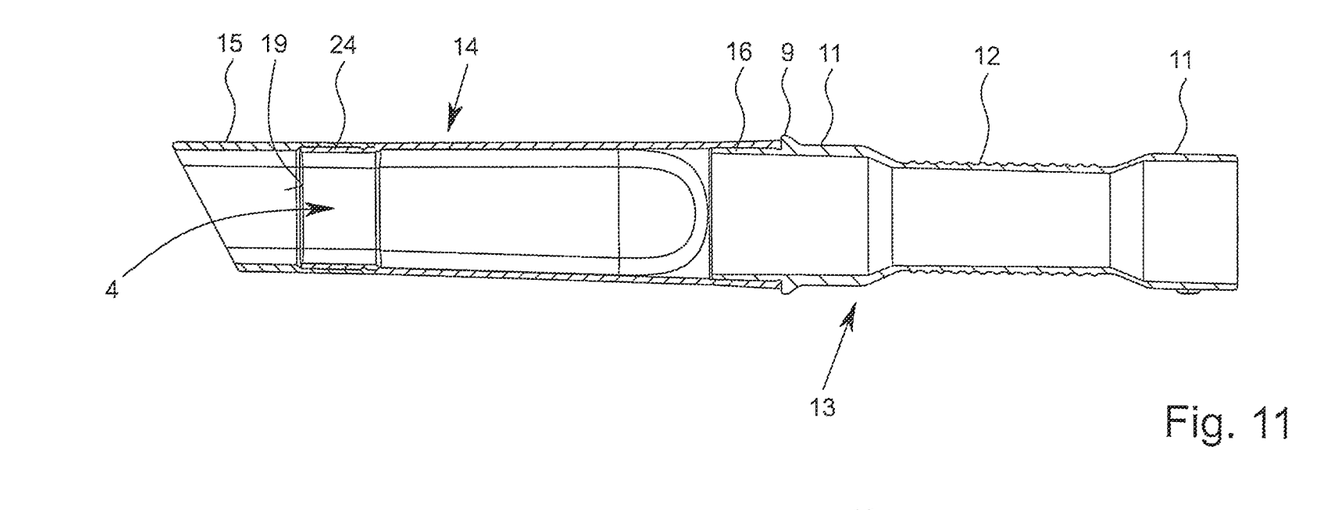

The holding of the suction cleaning attachment 1 in the quiver 3 is shown in FIGS. 6 and 7, for example. The non-used state is in fact before and after the internal cleaning of the motor vehicles and/or when the suction cleaning attachment 1 is not used for internal cleaning. In this state the suction cleaning attachment can be inserted into the quiver 3 as shown in FIG. 7 and held in it. The suction cleaning attachment 1 has an internal suction channel 4—as shown in FIG. 11—for guiding the suction air flow. The suction channel 4 is located inside the housing 5 of the suction cleaning attachment 1. A grip region 6 is provided on the outside of the housing 5.

The grip region 6 is understood to be that area of the suction cleaning attachment 1 which, when the suction cleaning attachment 1 is inserted in the quiver 3, is located outside the quiver 3 and/or above the outer edge 10 of the quiver 3. The suction channel 4 opens at its outer end 7 into a suction opening 8, as shown in FIG. 2.

Figure 2:
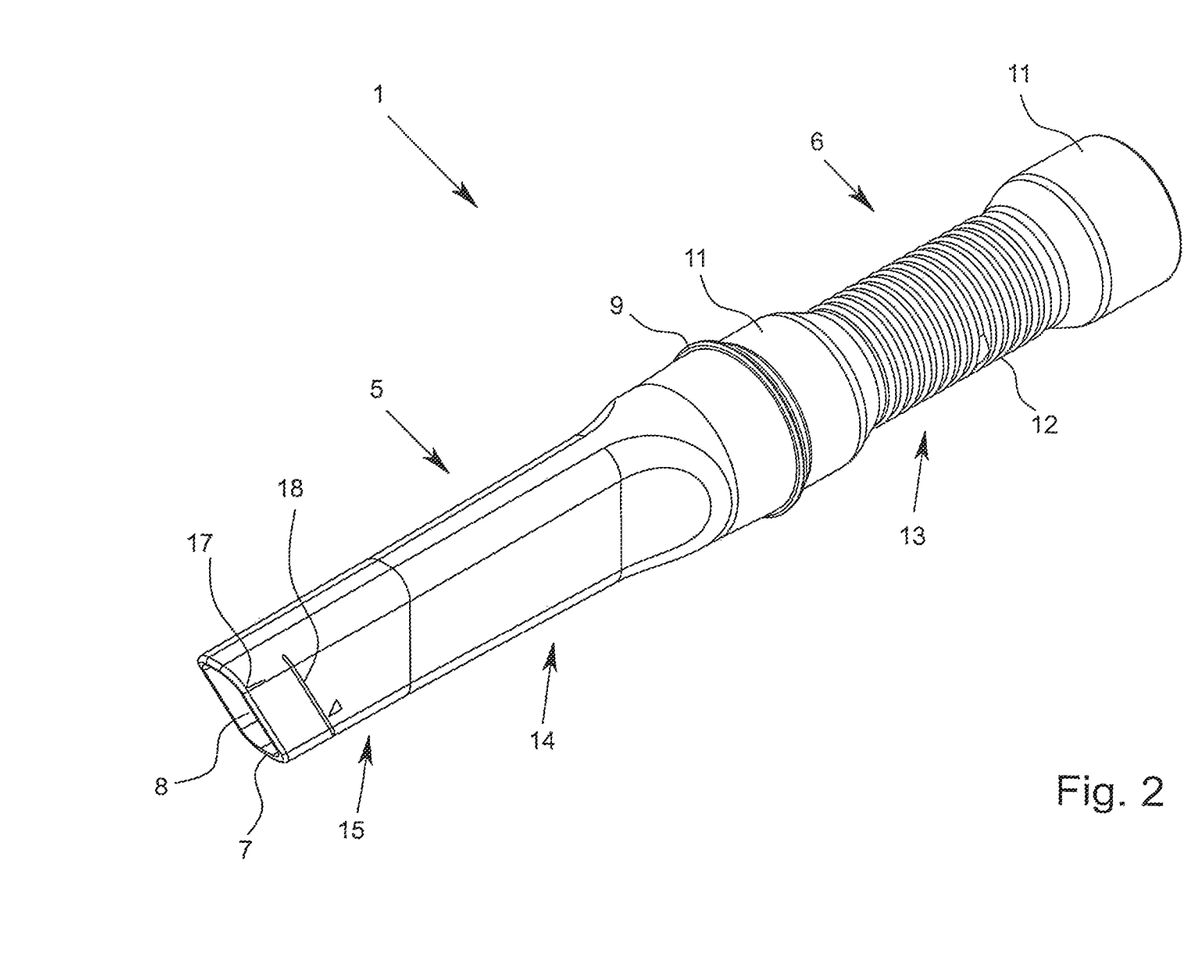

FIG. 2 also shows that on the outside of the housing 5, between the suction opening 8 and the grip region 6, there is a stop 9 which protrudes over the grip region 6 for interaction with the outer edge 10 of the quiver 3. An interaction between the stop 9 and the outer edge 10 and/or the outer border edge of quiver 3 is shown in FIG. 6, among others.

It is not shown that the stop 9 is designed as a step.

FIG. 6 shows that the stop 9 closes flush with and/or rests on the outer edge 10 of the quiver 3, in particular wherein the stop 9 protrudes over the outer edge 10 of the quiver 3. The interaction between the stop 9 and the outer edge 10 of the quiver 3 ensures the formation of an at least substantially pressure-tight seal between the quiver 3 and the suction cleaning attachment 1 when the suction cleaning attachment 1 is inserted into the quiver 3. It is understood that the term "pressure-tight" does not mean that absolute pressure tightness is achieved. "Pressure-tight" refers essentially to the condition when the stop 9 is lying flush on the outer edge 10 of the quiver 3.

Figure 3:
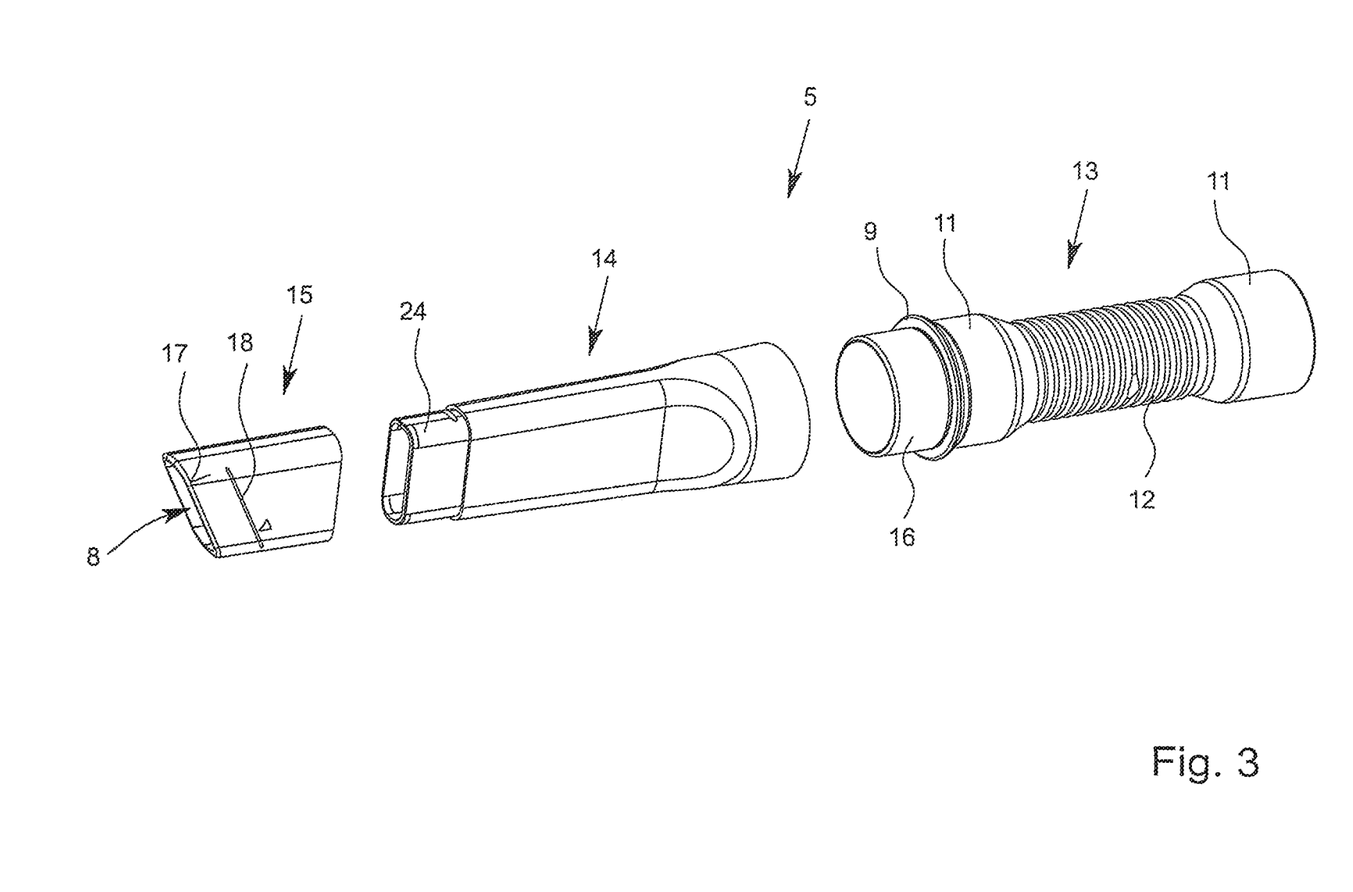

FIG. 3 shows that the stop 9 is designed as a circumferential, especially annular, projection. The stop 9 is actually at least essentially straight, uninterrupted and/or flat on its mounting surface facing the outer edge 10 of quiver 3. The stop 9 can be designed to correspond to the outer edge 10 of the quiver 3, so that a pressure-tight and friction-locking connection is produced when the suction cleaning attachment 1 is inserted into the quiver 3.

FIGS. 1 to 3 show that the suction cleaning attachment 1 and the housing 5 have a grip section 13. The grip section 13 has two outer connection ends 11 and a grip section region 12 provided between the connection ends 11. The grip section region 12 can serve as grip region 6 and can be designed in such a way that it allows a user to grasp the grip region 6 with one hand.

FIG. 3 shows that the connection end 11 and the grip section region 12 (which can serve as a handle) have an at least essentially hollow cylindrical shape.

FIG. 1 shows that the grip section region 12 is essentially freely accessible from the outside and is not obstructed by other components, especially not by a bracket spanning the grip section region 12. Lastly, a user can encompass the grip section region 12 of the suction cleaning attachment 1 from any side or in any position. The suction cleaning attachment 1 can be easily guided for cleaning the interior of motor vehicles.

Furthermore, FIG. 1 shows that at least one outer diameter of a connection end 11, in the design example shown both outer diameters of the connection ends 11, is larger than the outer diameter of the grip section region 12. In particular, the outside diameter of at least one connection end 11 is at least 10% larger than the outside diameter of the grip section region 12. The above-mentioned difference between the outside diameters results in a defined length of the grip section region 12, and a limitation of the movement of the hand on the grip section region 12 in the use state is otherwise specified.

FIG. 6 shows that the stop 9 actually represents a limitation of the insertion movement of the suction cleaning attachment 1 into the quiver 3. In particular, no movement beyond the stop 9 into the quiver 3 is possible. This is of particular importance since, in the state of the art, the suction cleaning attachment 1 is often inserted very firmly into the quiver 3 by the user, resulting in a very firm friction-locked connection, which often makes it very difficult to pull the suction cleaning attachment 1 out of the quiver 3 again. This problem is completely avoided in the invention.

FIG. 3 shows that the stop 9 is located at the connection end 11 facing the suction opening 8. The stop 9 protrudes on the outside beyond connection end 11.

Furthermore, FIGS. 1 to 3 show that the grip section region 12 has a corrugation and/or a structured surface on the outside. The corrugation can ultimately be in the form of a series of grooves.

FIG. 3 shows that the suction cleaning attachment 1 has at least three parts. The individual components of the suction cleaning attachment 1 and the housing 5 can be designed so that they can be plugged into each other. Finally, a detachable connection can be provided between the multi-part components of the housing 5 of suction cleaning attachment 1.

FIG. 3 shows that the housing 5 has a housing connection piece 14 which can be detachably connected to the grip section 13. Furthermore, an end piece 15 which can be detachably connected to the housing connection piece 14 is provided. The housing connecting piece 14 can be connected to the grip section 13 form-fittingly, force-fittingly and/or friction-fittingly detachably. The end piece 15 can in turn also be connected to the housing connecting piece 14 in a form-locking force-locking and/or friction-locking manner. The connection is in fact designed in such a way that loosening of the aforementioned components during use of the suction cleaning attachment 1 can be at least substantially avoided.

Furthermore, FIG. 3 shows that the grip section region 12 and/or the grip section 13 is designed rotationally symmetrical and/or mirror-symmetrical to a central longitudinal axis.

In addition, FIG. 3 shows that the grip section 13 with the connection region 16, which is provided at the connection end 11, can be inserted into the housing connection piece 14. Alternatively or additionally, the housing connection piece 14 can be plugged into the grip section 13.

Further FIG. 3 shows that the housing connection piece 14 is designed with a connection region 24 which can be plugged into the end piece 15. Alternatively or additionally, the end piece 15 can also be designed so that it can be inserted into the housing connection piece 14. Corresponding mounting areas are provided for the respective connection regions 16, 24.

Figure 9:
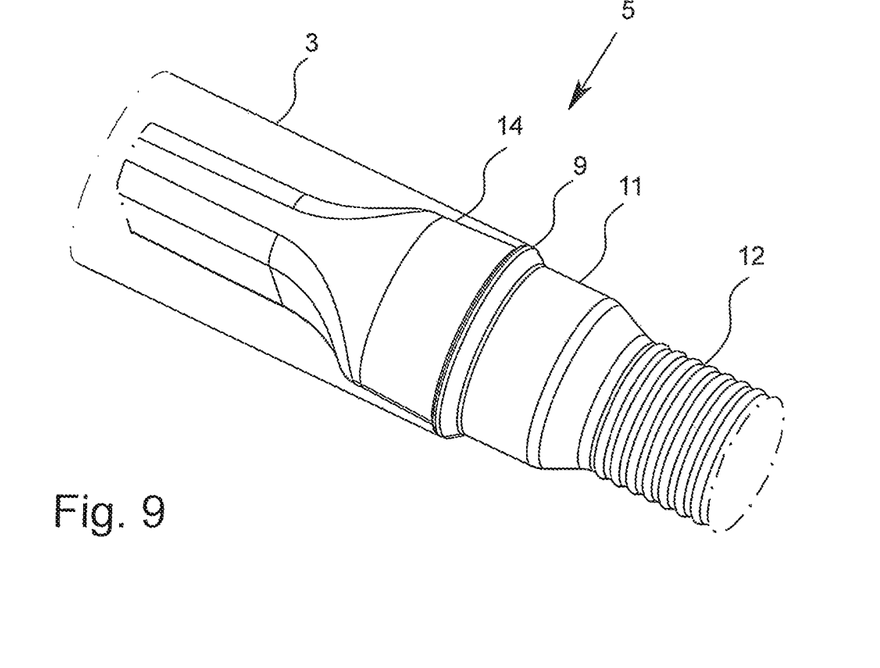

FIG. 9 shows that a taper, particularly a conical taper of the suction channel 4 of the housing connection piece 14 is provided following the reception area corresponding to the connection region 16. Thus, an at least essentially hollow cuboid and/or slit-like shape is formed, as also shown in FIG. 3.

Consequently, the suction channel 4 can taper towards the suction opening 8 in the area of the grip section region 12 and the housing connection piece 14.

FIG. 9 shows that the stop 9 is directly adjacent to the housing connection piece 14. The stop 9 protrudes over both the connection end 11 and the housing connection piece 14. The stop 9 is wider than the material thickness of the housing connection piece 14. The width and/or height of the stop 9 is particularly dependent on the insertion path of the suction cleaning attachment 1 into the quiver 3 and on the outer edge 10 of the quiver 3.

It is not shown that the stop 9, which is especially designed as a step, is located on the outside of the housing connection piece 14. In this case, the stop 9 does not necessarily have to protrude over the grip region 6, the grip section 13 and/or over the connection end 11. However, the stop 9 should be designed to limit the insertion movement into the quiver 3. This requires that behind the stop 9—facing the suction opening 8—no increase or enlargement of the suction cleaning attachment 1 and/or the housing 5 is provided beyond the stop 9.

Figure 10:
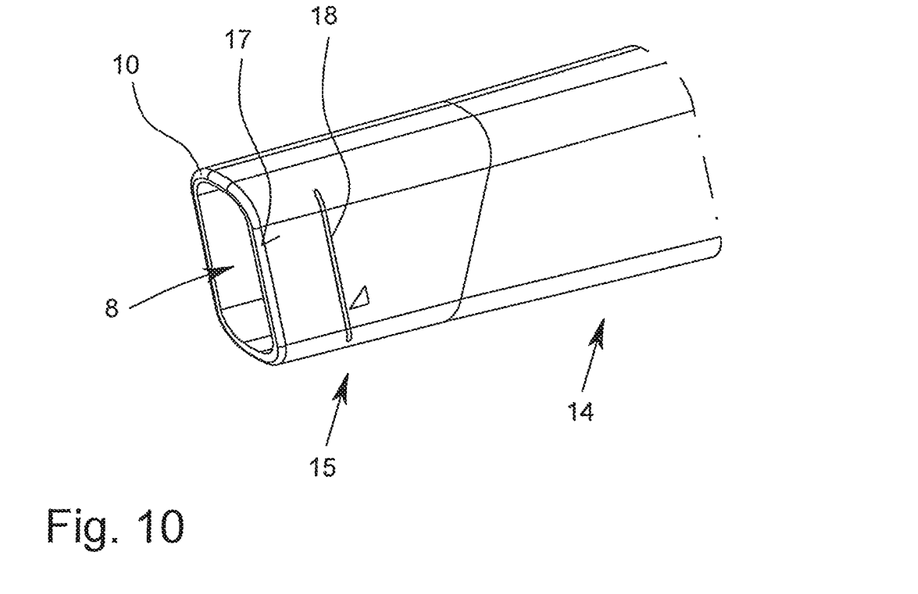

FIG. 10 shows that the end piece 15 has a bevel 17 on the suction end forming the suction opening 8. The bevel 17 can be designed in particular as a 45°±15° bevel.

FIG. 10 also shows that the end piece 15 has a marking 18 on the outside, especially parallel to the bevel 17, as a wear indicator. The marking 18 is arranged in such a way that it is arranged on the end piece 15 connected to the housing connection piece 14 at a distance from the outer edge 19 of the housing connection piece 14 facing the suction opening 8. The outer edge 19 of the housing connection piece 14 is shown in FIG. 11.

FIG. 11 also shows that a positive meshing of the end piece 15 into the connection region 24 of the housing connection 14 can also be provided.

It is not shown that the material of the housing 5, of the end piece 15, of the housing connection piece 14 and/or of the grip section 13 has a, in particular thermoplastic, plastic material. The plastic material can be polyethylene (PE), polypropylene (PP), polyvinyl chloride (PVC) and/or polystyrene (PS).

In addition, the cross-sectional area of the suction channel 4 can be between 100 mm$^2$ and 1000 m$^2$. Furthermore, the cross-sectional area of the suction channel 4 can be reduced along the suction cleaning attachment 1 towards the suction opening 8.

It is not shown that a lighting device can be assigned to suction cleaning attachment 1. The lighting device can have at least one LED. In addition, the lighting device can be held on the housing 5, on the housing connection piece 14 and/or on the end piece 15. The lighting device can be connected via at least one cable to the power supply. The cable may be connected to a power connection which may be provided in the area of the grip region 6. The cable can be guided inside the housing 5.

Furthermore, it is not shown that the lighting device can be integrated in the housing socket 14 and/or end piece 15 in a corresponding receptacle in the form of a channel.

Figure 4:
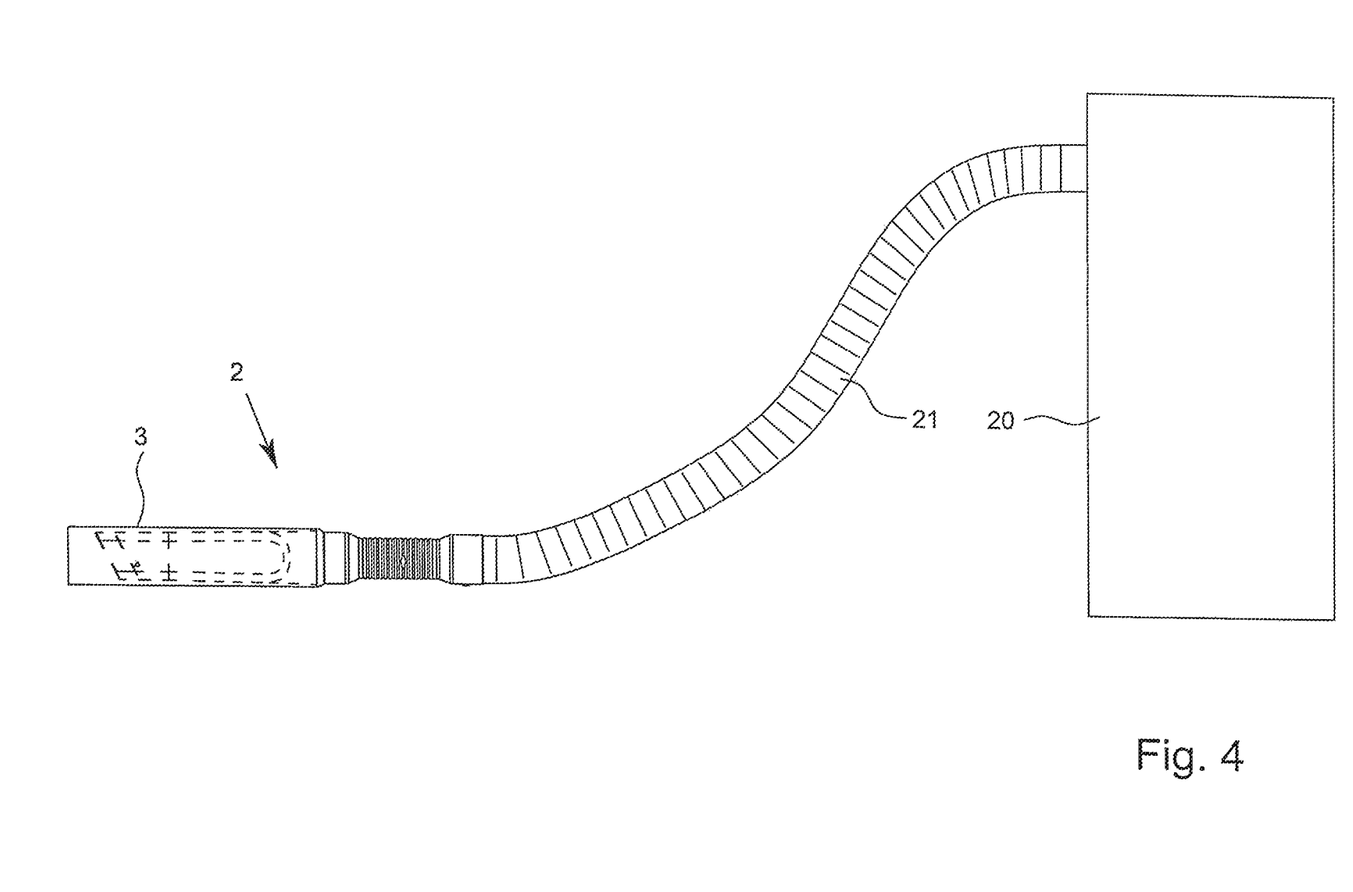

FIG. 4 shows a cleaning device 2 for use in the interior cleaning of motor vehicles. The cleaning device 2 has a suction cleaning attachment 1 according to one of the previously described embodiments. A quiver 3 is provided for holding the suction cleaning attachment 1 in the non-used state. A blower device 20 is assigned to the suction channel 4 and serves to generate a vacuum. The blower device 20 is connected to the suction channel 4 of the suction cleaning attachment 1 via a hose 21.

In particular, the hose 21 is connected to the connection end 11 of the suction cleaning attachment 1 facing away from the suction opening 8.

Figure 5A:
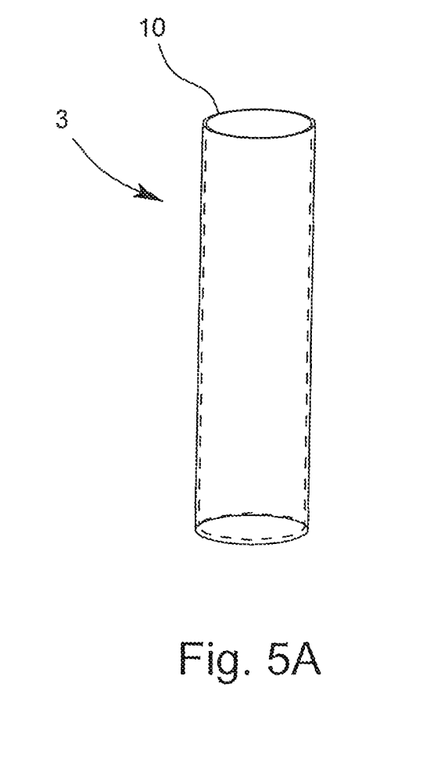

In FIG. 5a the quiver 3 is shown. The quiver 3 can be hollow cylindrical. In addition, the quiver 3 is closed at its bottom and has a quiver opening opposite the bottom.

In the case of the quiver 3 shown in FIG. 5a, it is intended that the outer edge 10 of the quiver 3 closes at least essentially flush with the stop 9 of the suction cleaning attachment 1 in the non-used state, as shown in FIG. 6.

Figure 5B:
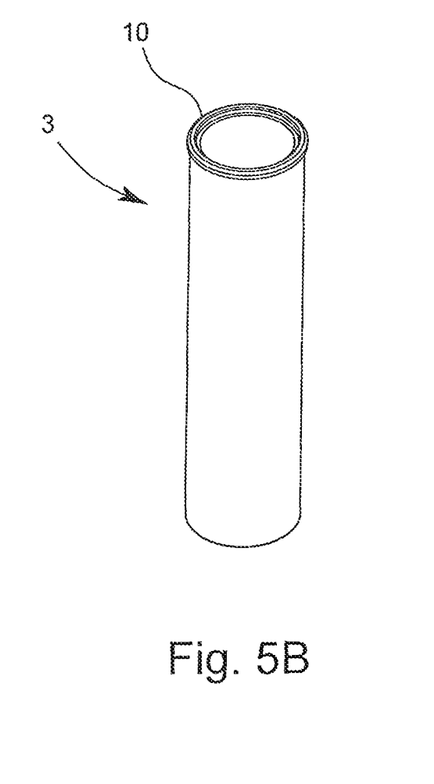

FIG. 5b shows that the outer edge 10 of the quiver 3 can be understood as the outer edge area. In the example embodiment shown, the outer edge 10 has an inner stop which, in the non-used state, can at least essentially be flush with stop 9 of suction cleaning attachment 1. In this context, the stop 9 of the suction cleaning attachment 1 can be surrounded at least in some areas by the outer edge 10 of the quiver 3 in the non-used state and in the inserted state in the quiver 3, as shown in FIG. 12.

Figure 12:
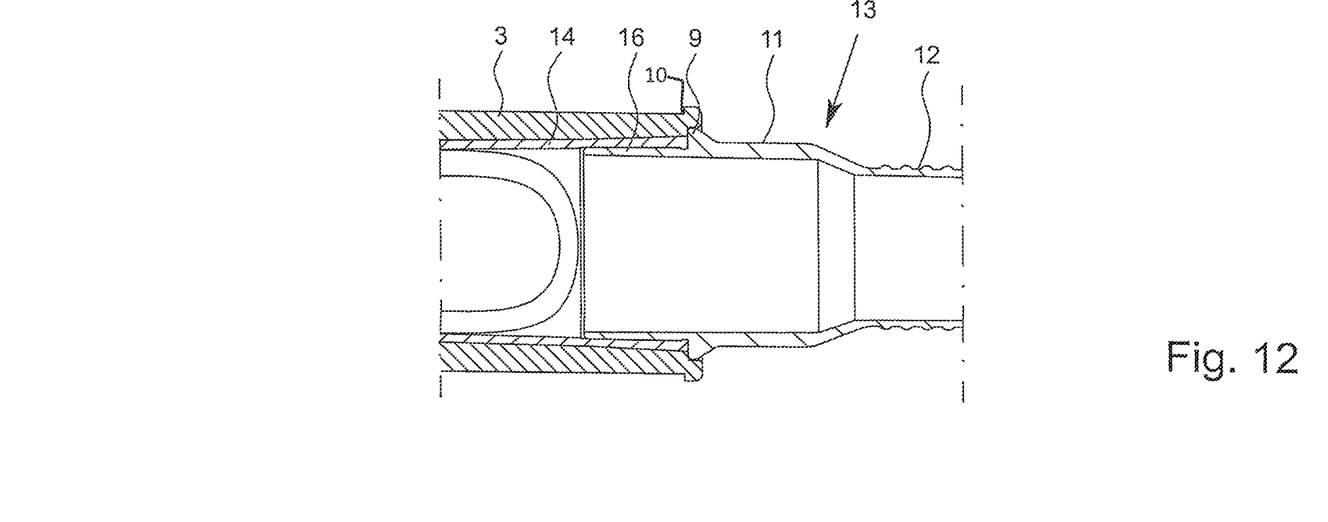

FIG. 12 shows that the outer diameter of the outer edge area 10 of quiver 3 is larger than the outer diameter of the stop 9 of the suction cleaning attachment 1. In other embodiments, the outer diameter of the outer edge area 10 of quiver 3 can be at least substantially equal to the outer diameter of stop 9 of suction cleaning attachment 1. In this case, the surfaces of the stop 9 and the step formed in quiver 3 lie on top of each other, so that the stop function described above actually results. FIG. 12 further shows that the inner diameter of the inner stop of the outer edge 10 of the quiver 3 is larger than or equal to the largest outer diameter of the front area of the suction cleaning attachment 1, which is located behind (i.e. facing the closed bottom of the quiver 3) the inner stop of the quiver 3.

The stop 9 of the suction cleaning attachment 1 interacts with the outer edge 10 of the quiver 3 in such a way that an at least substantially pressure-tight seal is created. The pressure-tight seal is achieved in the non-used state. In particular, the negative pressure is continuously provided by the blower device 20. The pressure-tight closure can provide an at least essentially self-contained system, provided that the suction cleaning device 2 only has a cleaning attachment 1.

FIG. 7 shows that cleaning device 2 has a plurality of suction cleaning attachments 1. In this case, only one suction cleaning attachment 1 can be inserted in the quiver 3, while another suction cleaning attachment 1 is used. In this case there would not be a self-contained system, but the electrical energy required for the blower device 20 is reduced by the arrangement of at least one suction cleaning attachment 1 in the quiver 3 and the pressure-tight seal between the quiver 3 and the suction cleaning attachment 1.

FIG. 6 shows that the stop 9 lies flush with the outer edge 10 of the quiver 3 and rests on this outer edge 10.

It is not shown that a vacuum of between 0.3 and 0.8 bar is provided in suction channel 4 during suction operation.

Figure 8:
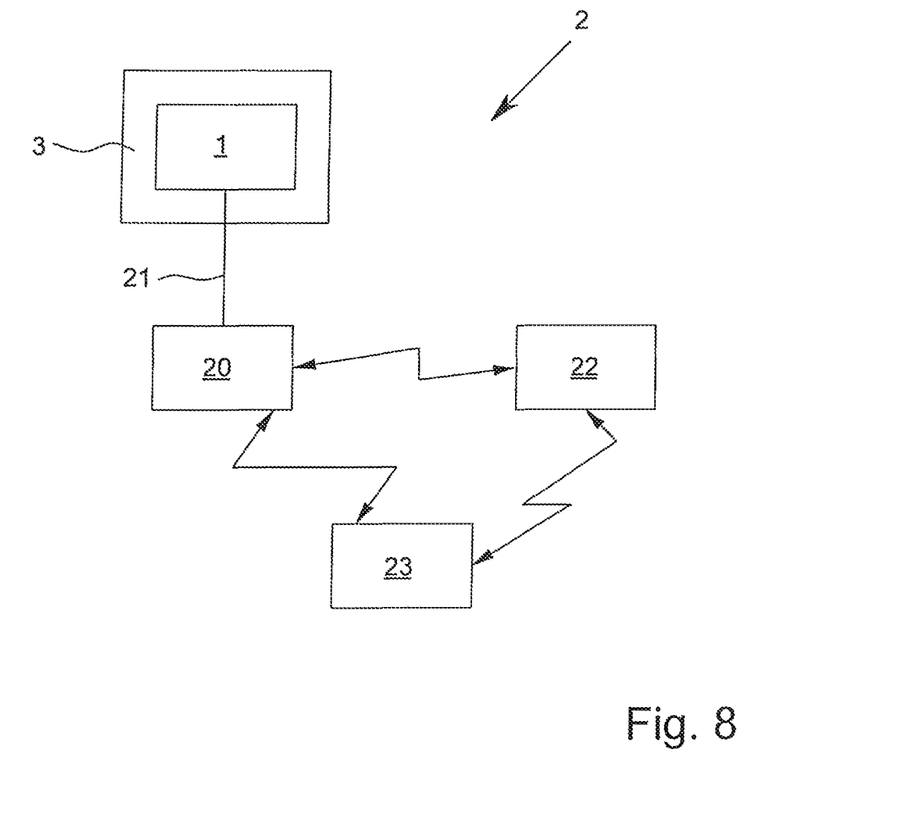

FIG. 8 shows that the blower device 20 has a control device 22. The control device 22 can reduce the electrical energy supplied to the blower device 20 from an energy supply unit 23 for generating the vacuum during the condition of the suction cleaning attachment 1 inserted in the quiver 3.

In particular, at least one pressure sensor can be assigned to the control device 22, which in particular measures and/or determines the pressure difference to be compensated. Provided that the suction cleaning attachment 1 is inserted in the quiver 3 and a pressure-tight seal is produced between the outer edge 10 of the quiver 3 and the stop 9, the pressure difference in particular is very small. In this way, the electrical energy provided by the energy supply unit 23 for the blower device 20 can be reduced.

However, in the use state there is a pressure difference to the atmospheric pressure (approx. 1 bar) which ultimately ensures "suction operation". In order to provide the continuous suction air flow and the required negative pressure, the pressure difference is maintained, especially in the used state and thus the electrical energy required for this is also provided by the energy supply unit 23.

LIST OF REFERENCE SIGNS

1 Suction cleaning attachment
2 Cleaning device
3 Quiver
4 Suction channel
5 Housing
6 Grip region
7 Outer end of 4
8 Suction opening
9 Stop
10 Outer edge of 3
11 Connection end
12 Grip section region
13 Grip section
14 Housing connection piece
15 End piece
16 Connection region of 13
17 Bevel
18 Marking
19 Outer edge of 14
20 Blower device
21 Hose
22 Control device
23 Energy supply unit
24 Connection region of 14

The invention claimed is:

1. A system including a suction cleaning attachment of a cleaning device configured for an interior cleaning of motor vehicles by suction air flow, and a quiver, the suction cleaning attachment having a housing having an internal suction channel configured to guide the suction air flow and a grip region provided on an outside of the housing, wherein the suction channel leads into a suction opening at an outer end, wherein on the outside of the housing at a first of two outer connection ends, the first of the two outer connection ends located between the suction opening and a grip section region, a stop projects radially beyond the grip region to interact with an outer edge of the quiver, the suction cleaning attachment configured for insertion and for holding in the quiver when not in use, wherein:

a grip section is provided as a portion of the grip region, the grip section having the two outer connection ends and the grip section region provided between the two outer connection ends, wherein at least one outer diameter of a connection end is larger than an outer diameter of the grip section region, one or more of the grip section and the grip section region is formed one or more of rotationally symmetrical and mirror-symmetrical to a central longitudinal axis, the quiver holds the suction cleaning attachment when not in use, the quiver is a hollow cylinder and is closed at one end, wherein the stop of the suction cleaning attachment interacts with the outer edge of the quiver to produce a pressure-tight closure, and the stop sits flush with outer edge of the quiver.

2. The suction cleaning attachment according to claim 1, wherein the stop is a circumferential projection.

3. The suction cleaning attachment according to claim 1, wherein the stop is arranged at the connection end facing the suction opening, wherein the stop projects externally beyond the connection end.

4. The suction cleaning attachment according to claim 1, wherein the grip section region has one or more of a corrugation and a structured surface on an outside portion thereof.

5. The suction cleaning attachment according to claim 1, wherein the suction cleaning attachment is formed in at least three parts.

6. The suction cleaning attachment according to claim 1, wherein the housing has a housing connection piece which can be releasably connected to the grip section, wherein one or more of: the housing further has an end piece which can be releasably connected to the housing connection piece, the housing connection piece is connected to the grip section, and the end piece is connected to the housing connection piece in a form-locking, force-locking and/or friction-locking manner.

7. The suction cleaning attachment according to claim 1, wherein the grip section can be inserted with a connection region into a housing connecting piece and/or that the housing connecting piece can be inserted with a connection region into an end piece.

8. The suction cleaning attachment according to claim 1, wherein the stop, which projects beyond the grip region and/or the grip section, directly adjoins a housing connection piece, wherein the stop projects beyond the housing connection piece, or wherein the stop is arranged on the outside of the housing connection piece, facing the connection end facing the suction opening.

9. The suction cleaning attachment according to claim 1, wherein an end piece has a bevel at the suction end forming the suction opening.

10. The suction cleaning attachment according to claim 9, wherein the end piece has on the outside a marking as a wear indicator, extending parallel to the bevel, wherein the marking is arranged such that it is spaced apart from the outer edge of a housing connection piece facing the suction opening when the inserted end piece is connected to the housing connection piece.

11. The suction cleaning attachment according to claim 1, wherein one or more of the material of the housing, of an end piece, of a housing connection piece and/or of the grip section includes one or more of thermoplastic, plastic, polyethylene (PE), polypropylene (PP), polyvinyl chloride (PVC) and polystyrene (PS).

12. The suction cleaning attachment according to claim 1, wherein a cross-sectional area of the suction channel is between 100 mm$^2$ to 1000 mm$^2$.

13. A cleaning device adapted for interior cleaning of motor vehicles, with the suction cleaning attachment according to claim 1 and with a blower device configured to generate a negative pressure, wherein the blower device is connected to the suction channel via a hose.

14. The cleaning device according to claim 13, wherein the blower device has a control device configured to reduce energy supplied to the blower device that generates the negative pressure during the insertion of the suction cleaning attachment into the quiver.

15. A suction cleaning system comprising:
a quiver that receives a portion of a suction cleaning attachment when not in use
a housing having an internal suction channel configured to guide suction air flow;
a grip region provided on an outside of the housing, wherein the suction channel leads into a suction opening at an outer end,
wherein:
on an outside of the housing at a first of two outer connection ends, the first of the two outer connection ends located between the suction opening and a grip section region, a stop projects radially beyond the grip region and is configured to interact with an outer edge of the quiver,
a grip section is provided as a portion of the grip region, the grip section having the two outer connection ends and a structured surface portion provided between the two outer connection ends, wherein at least one outer diameter of a connection end is larger than an outer diameter of the structured surface portion,
one or more of the grip section and the structured surface portion is formed one or more of rotationally symmetrical and mirror-symmetrical to a central longitudinal axis of the grip section,
the quiver holds the suction cleaning attachment when not in use,
the quiver is a hollow cylinder and is closed at one end, wherein the stop of the suction cleaning attachment interacts with the outer edge of the quiver to produce a pressure-tight closure.

16. A suction cleaning system comprising:
a quiver that receives a portion of a suction cleaning attachment when not in use use by a user and to block suction air flow;
a housing having an internal suction channel configured to guide the suction air flow when in use, wherein the suction channel leads into a suction opening at an outer end of the housing,
wherein:
on an outside of the housing at a first of two outer connection ends, the first of the two outer connection ends located between the suction opening and a grip, a stop projects radially beyond the grip and is configured to interact with an outer edge of the quiver,
the grip having the two outer connection ends and a structured surface portion provided between the two outer connection ends, wherein an outer diameter of at least one connection end is larger than an outer diameter of the structured surface portion,
the grip is formed one or more of rotationally symmetrical and mirror-symmetrical to a central longitudinal axis of the grip, the quiver holds the suction cleaning attachment when not in use, the quiver is a hollow cylinder and is closed at one end, wherein the stop of the suction cleaning attachment interacts with the outer edge of the quiver to produce a pressure-tight closure.

\* \* \* \* \*